INVENTORS
James F. Campbell, &
BY Robert M. Swick

Paul Fitzpatrick
ATTORNEY

United States Patent Office 3,067,576
Patented Dec. 11, 1962

3,067,576
CO-ORDINATED MAIN AND AFTERBURNER
FUEL CONTROLS FOR A TURBOJET
James F. Campbell, Cincinnati, Ohio, and Robert M.
Swick, Indianapolis, Ind., assignors to General Motors
Corporation, Detroit, Mich., a corporation of Delaware
Filed Aug. 28, 1959, Ser. No. 836,645
7 Claims. (Cl. 60—35.6)

Our invention relates to fuel control mechanisms for turbojet engines, and particularly to a fuel system for a turbo jet engine having a main burner and an afterburner in which the fuel system comprises improved means for metering the afterburner fuel in proportional relation to the main fuel.

The principal objects of the invention are to provide an improved and simplified fuel control for turbojet engines having afterburners and to provide a fuel system which minimizes conflicts between the main and afterburner fuel controls which may otherwise result in instability of the engine and difficulty of control.

Other objects of the invention are to provide a simple and accurate afterburner fuel control, and to provide an afterburner fuel control with means for metering afterburner fuel as a function of main fuel flow.

By way of introduction to the explanation of the nature of the invention, it is well known that standard turbojet engines include a main burner or combustion apparatus which heats the air delivered by the compressor of the engine to provide motive fluid for a turbine which drives the compressor. The turbine exhaust gases provide the propulsive jet. Many such engines are also provided with afterburners, which are combustion devices in the turbine exhaust duct of the engine. Combustion in the afterburner raises the temperature of the exhaust gases and thereby the velocity and propulsive effect of the jet. In most engines, the afterburner is intended only for intermittent use for maximum power on take-off or under emergency conditions.

In general, an afterburning engine is provided with two fuel controls or fuel metering devices, one for the main burner and one for the afterburner. Both of these are rather complex, and ordinarily the main fuel control is quite elaborate. So far as we are aware, in all practical installations, the main and afterburner fuel controls are entirely or substantially independent of each other.

We are aware that proposals have been made to provide a device which establishes some ratio between main and afterburner fuel so that metering of afterburner fuel is controlled, to some extent at least, by main fuel flow. It does not appear that any such proposed device has been of such character as to solve adequately the problems of afterburner fuel control.

Our invention provides a simple but highly adequate and suitable arrangement which interrelates the main and afterburner fuel controls in such a manner that the afterburner fuel is controlled as a function of main fuel. This has numerous advantages. One advantage lies in the fact that the afterburner fuel control may be very simple and may depend for its accurate operation to some extent upon the necessarily elaborate and precise main fuel control. Another advantage of our system is that it provides very simply for coordination of the main and afterburner operation. Still another advantage is that it makes it feasible to employ the same pumping means or source for the main burner and afterburner. Another advantage is that the main control compensation for variations in fuel density and heating value corrects afterburner fuel also for these characteristics.

The nature of the invention may be indicated by a brief description of the preferred embodiment of the invention. The fuel supplied to the main burner of the engine is metered by a valve controlled by a fuel control mechansim which ordinarily includes a governor and other devices responsive to engine conditions to supply the quantity of fuel required to cause the engine to run at the desired speed or desired turbine inlet temperature and prevent hazardous conditions of operation. The main fuel control is regulated by a manually settable pilot's power control to establish the desired power level of the turbine engine. Afterburner fuel is metered by a valve which is moved in one dimension by the main fuel control. The afterburner metering valve is moved in another dimension by means responsive to the setting of the pilot's control and to a condition such as compressor inlet temperature or compressor outlet temperature. The pilot's power control establishes the desired level of afterburner thrust augmentation, and the control responsive to temperature corrects the afterburner fuel flow to compensate for the variation of main fuel with air temperature and, in some cases, engine rotational speed. The afterburner fuel rate is thus the product of two quantities, one determined directly by main fuel flow and the other determined by the power control lever setting and the corrective factor derived from air temperature. The factors just mentioned control the areas of the two metering valves, and means are provided to maintain the same metering head or pressure drop across both metering valves, or proportional drops across the valves, so that the ratio of the two flows is determined by the valve areas established as described above.

The nature of the invention and the advantages thereof will be fully apparent to those skilled in the art from the succeeding detailed description of preferred embodiments of the invention and the accompanying drawings thereof.

Figure 1:
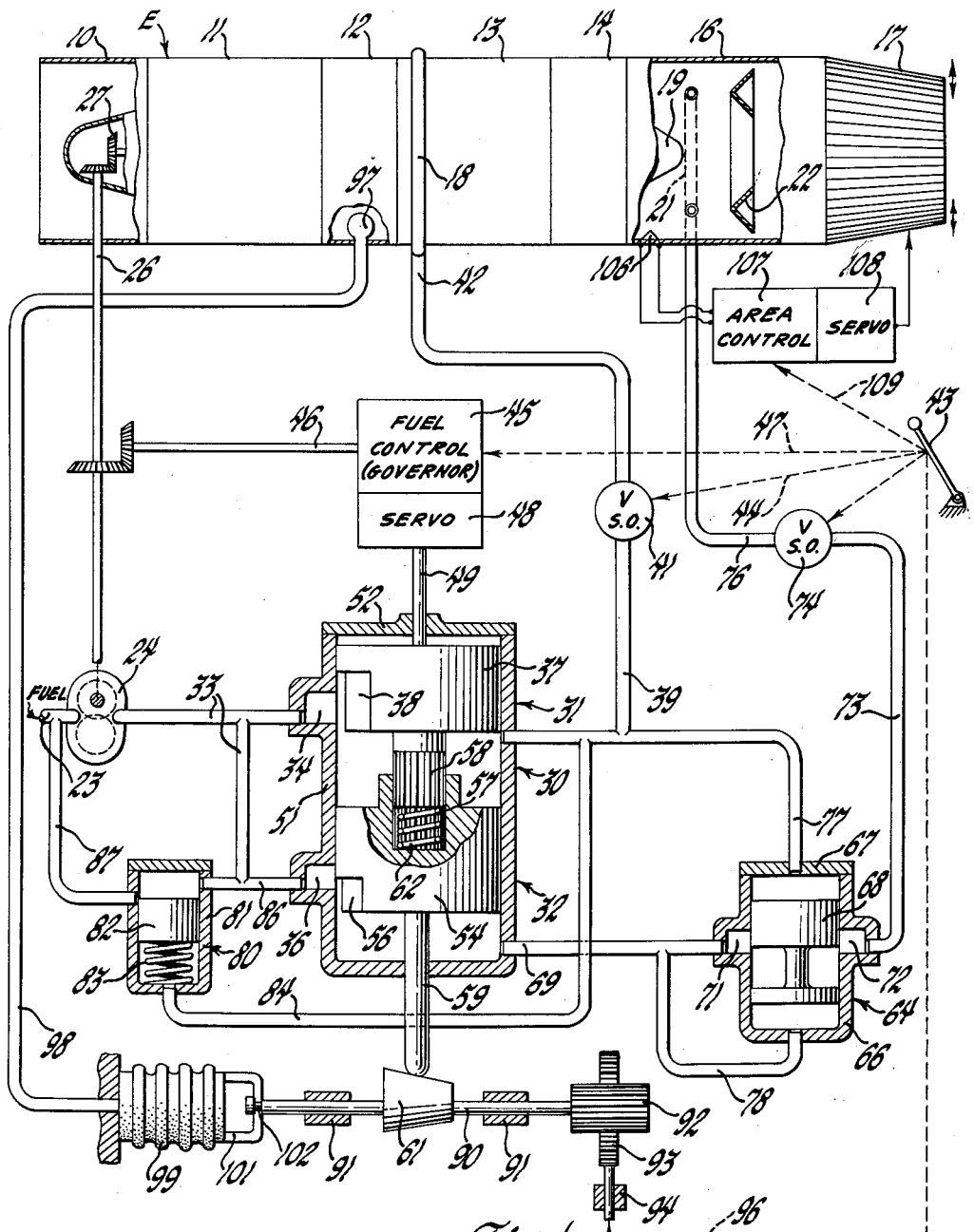
FIGURE 1 is a schematic diagram of a turbojet engine fuel control system.

Referring first to FIGURE 1, there is illustrated a turbojet engine E of known type comprising the usual air inlet section 10, compressor 11, compressor outlet section or diffuser 12, main combustion apparatus or main burner 13, turbine 14, exhaust duct 16, and variable area exhaust nozzle 17. Fuel is supplied to the main burner by a fuel manifold 18. The engine includes an afterburner mounted downstream of the tailcone 19. This afterburner may comprise a fuel manifold or spray ring 21 and the usual flame holders 22. It will be understood that this structure is shown schematically, and is illustrative of a typical turbojet engine with which the fuel control of this invention may be employed.

Fuel from any suitable source such as aircraft boost pumps is supplied through a line 23 to a fuel pump 24 of any suitable type, preferably driven by the engine through a power take-off or accessory drive shaft 26 driven by the engine through gearing 27. This pump supplies fuel both to the main fuel manifold 18 and the afterburner fuel manifold 21. Fuel is metered by a metering valve assembly 30 which includes a main fuel metering valve 31 and an afterburner fuel metering valve 32. The fuel from the pump 24 is conducted through conduits 33 to fixed rectangular metering ports 34 and 36 of the main and afterburner metering valves, respectively. The main fuel is metered by a rotary valve member 37 having a recess or slot 38 of rectangular outline in the wall thereof which cooperates with the port 34, rotation of valve member 37 determining the effective area of port 34. Fuel flows from the metering valve 31 through a line 39, a shut-off valve 41 and line 42 to the main burner.

The operation of the engine, including the afterburner, is controlled by a manually settable pilot's power control lever 43 which is connected by any suitable means indicated by the broken line 44 to the shut-off valve 41 so that this valve is closed when the control lever is moved to the engine shut-down position, and is otherwise open.

The open area of the main metering valve 31 is determined, under control by the pilot's lever 43, by a main fuel control 45 which ordinarily includes a governor and various other mechanisms which control or limit engine fuel. The details of the main fuel control are immaterial to the invention. It is well known that such controls include means responsive to various parameters of engine operation to insure safe operation of the engine, facilitate starting, acceleration, and deceleration, and prevent unstable operation or loss of combustion. In a turbojet engine, the dominant fuel control under normal operating conditions ordinarily is a governor set by the pilot's control to establish a desired rotational speed of the turbine. Additional controls to prevent over-temperature or other hazardous conditions and to modulate fuel flow as a function of such conditions as pressure and temperature of the air entering the engine are ordinarily included.

Our invention lies in the coordination of the main and afterburner fuel controls and may incorporate various standard main fuel controls. For this reason, it is unnecessary to enlarge further upon the nature of such controls or to illustrate any particular main fuel control mechanism.

Since such controls usually include a governor, a shaft 46 driven from the accessory drive shaft 26 is provided to operate a governor in the fuel control. The speed setting of the governor may be determined according to a desired schedule by the pilot's lever 43, which may be connected to a speeder spring or other speed setting mechanism of the governor by any suitable connecting means indicated by the broken line 47. The fuel control 45 determines the opening of the main metering valve 31 to make engine speed equal that called for by the pilot's power control lever. It may include a servomechanism as indicated at 48 by which the output of the fuel control tending to open or close the main metering valve 31 is fed to a rotatable shaft 49 fixed to the movable valve member 37. This valve member is mounted in a cylindrical housing 51 having an end cover 52 through which shaft 49 passes.

Figure 4:
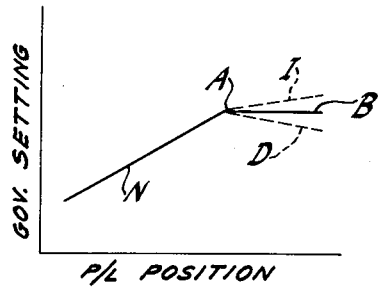
FIGURE 4 is a chart illustrating the relation of governor setting to power lever position.

Assuming that the governor setting is the normal limiting factor on engine fuel supply, as it usually is in a turbojet engine, the operation is illustrated by the chart of FIGURE 4, showing the governor setting as a function of power lever position. The engine speed will follow the governor setting in the absence of some overriding influence such as Mach number, pressure, or temperature limiters affecting the fuel supply. The governor setting is increased from a low value suitable for idling operation of the engine as the power lever is moved ahead. The governor setting may, if desired, be a linear function of power lever position as indicated by line N in FIGURE 4. At some point in the range of movement of the power lever, indicated by the point A in FIGURE 4, the afterburner is brought into operation. In most turbojet engines, the afterburner is used only when the engine is running at its normal maximum rated speed, and therefore the governor setting remains constant, as represented by the line B in FIGURE 4, as the power lever is moved further toward its maximum power position. However, it is possible to increase the governor setting as indicated by the line I or decrease the governor setting as indicated by the line D as the power lever is advanced during afterburning.

Figure 5:
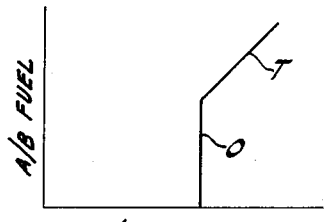
FIGURE 5 is a chart illustrating the relation of afterburner fuel supply to power lever postion.

FIGURE 5, which is correlated with FIGURE 4, indicates in a general way the supply of fuel to the afterburner as a function of power lever position. The vertical line O represents the increase of afterburner fuel from zero to the minimum value at the power lever position which energizes the afterburner. Line O corresponds to the same power lever position as point A in FIGURE 4. Further movement of the power lever increases afterburner fuel flow to vary the thrust augmentation, as indicated by the line T. As will be seen from the subsequent description, the amount of afterburner fuel may vary in response to factors other than power lever position, but FIGURE 5 indicates the general nature of the afterburner fuel schedule.

As previously stated, the main fuel control compares the speed setting signal from the pilot's power lever with the actual rotational speed of the engine and rotates valve member 37 to increase or decrease fuel flow to hold the engine on the set speed. This movement of valve member 37 is also imparted to the afterburner metering valve 32, which thus has one input determining fuel flow which is proportional to the flow determining input of the main metering valve 31. A suitable structure for this purpose is illustrated schematically in FIGURE 1. The afterburner metering valve includes a rotatable and axially movable valve member 54 in the valve cylinder 51. An arcuate recess or notch 56 of rectangular outline in the valve member 54 cooperates with rectangular port 36 to which fuel is supplied by pump 24 through line 33. Valve member 54 has a splined cavity 57 in sliding engagement with the splined end 58 of a stem integral with main metering valve member 37 so that valve member 54 rotates with valve member 37, but may move axially in the cylinder.

Figure 3:
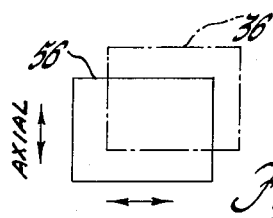
FIGURE 3 is a diagram illustrating the action of the afterburner fuel metering valve.

Axial movement of member 54 is determined by a stem 59 actuated by a suitable mechanism, to be described, including a three-dimensional cam 61 engaging the end of stem 59. Suitable means to bias stem 59 into engagement with the cam may be provided by a compression spring 62 mounted in the recess 57. As indicated schematically in FIGURE 3, rotary movement of valve member 54 changes the effective area of the metering orifice by moving notch 56 in one direction with respect to port 36. Axial movement likewise varies the metering area, and the total area which determines fuel flow is the product of the axial and rotary displacements of valve member 54 from a datum position at which the valve is closed. Therefore, the effective area of the afterburner metering valve is the product of the area of the main metering valve by a quantity determined by the axial displacement of valve member 54. In other words, the afterburner fuel is proportional to the main fuel, the proportionality factor or ratio being determined by the displacement of member 54 by cam 61.

In order for the fuel flows to follow the desired proportionality ratio, it is necessary for the metering heads across the two metering valves to be in some constant ratio so that the flow ratio is not disturbed by variations in the metering heads across the metering valves. For this reason, the system includes a valve which maintains equal pressure drops across the two metering valves. However, it will be understood that drops which are not equal but which are in a constant ratio may be satisfactory for this purpose.

Proceeding to the means for equalizing the metering heads, this comprises an equalizing valve 64 including a body or cylinder 66 and a head 67, within which is mounted a throttling valve spool 68. The afterburner fuel metered by the valve 32 flows through a conduit 69 from a constantly open port in the metering valve to a port 71 in the equalizing valve which is throttled by the spool 68. Fuel flows from the equalizing valve through the port 72, which may also be throttled by spool 68, and through a conduit 73, shut-off valve 74, and conduit 76 to the afterburner fuel manifold 21. A pressure connection 77 leads from the main fuel line to the chamber above spool 68, this pressure thus biasing spool 68 downwardly as illustrated in the direction to close ports 71 and 72. A pressure connection 78 leads from the afterburner fuel line 69 ahead of the equalizing valve to a chamber below the valve spool, this pressure acting on spool 68 in the direction to open the throttling ports. The particular arrangement illustrated is based upon the fact, common to all standard engines, that the pressure required in afterburner fuel manifold 21 is lower than that required in the main fuel manifold 18. Therefore, by throttling the flow to the afterburner, the pressure in line 69 downstream of the afterburner metering valve may be raised so as to equal that in line 39 downstream of the main metering valve. As will be apparent, when the afterburner is in operation, the pressure of main fuel supplied through connection 77 will move valve spool 68 in a closing direction until the pressure in line 69 supplied through connection 78 is raised to equal that of the main fuel. Any change in pressure in either fuel line will immediately be reflected in movement of valve spool 68 to maintain this condition of equality. Since the pressures at ports 34 and 36 are also equal, the metering heads across valves 31 and 32 will be equal.

It will be seen that it is possible to maintain main and afterburner fuel metering heads equal by this very simple mechanism. It is, of course, possible to provide more elaborate mechanisms directly responsive to the pressure drops across the two metering valves which will maintain the two drops proportional to each other, but not equal. Since maintenance of equal pressure drops leads to the simplest structure, it is preferred.

The afterburner is put into or out of operation by the shut-off valve 74 controlled by the power control lever 43 so that no fuel is supplied to the afterburner until the afterburning range of movement of the power lever is reached, at which point valve 74 is completely opened. This is necessary because it is undesirable to have a small amount of fuel supplied to the afterburner which will not burn properly or to operate the afterburner when the engine is operating at a low power setting. The shut-off valve 74 may also, as is customary, have some sort of overriding control (not illustrated) which prevents it from opening unless the engine has reached the full operating speed needed for satisfactory afterburner operation.

It is usual practice in fuel metering systems embodying a positive fixed displacement pump to include a metering head regulating valve which determines the pressure drop across the main metering valve so that flow to the engine is determined directly by the opening of the main metering valve and is not affected by conditions which would otherwise vary the metering head. Such a conventional head regulating valve is illustrated at 80. It comprises a cylinder 81 in which is mounted a slidable valve member 82 biased by a compression spring 83. A pressure connection 84 supplies the pressure in line 39 downstream of the main metering valve to the chamber below plunger 82. A bypass line 86 enters the chamber above the plunger 82, and a return line 84 to the pump inlet is throttled by plunger 82. The valve 80 thus maintains the pressure in pump discharge line 87 at a substantially fixed differential above the pressure in metered fuel line 39, the pressure difference being determined by the force of spring 83.

With a closed loop type of control, a metering head regulating valve is not essential, but it is desirable. With a fixed displacement pump, some sort of relief valve (not illustrated) is necessary. Since the relief valve will control the unmetered fuel pressure, it is possible to eliminate the head regulating bypass valve, if desired. As will be apparent, such a relief valve may be similar to valve 80 if the pressure connection 84 is eliminated and the bypass pressure is determined only by the setting of spring 83. If the pump 24 is of an impositive type such as a centrifugal or turbine pump, neither a relief valve nor a head regulating valve is necessary.

We may now proceed to a description of the mechanism which determines the ratio between the main and afterburner fuel flows. Since the gases exhausting from the turbine are at nearly constant temperature, it is desirable to maintain the desired fixed ratio of fuel to air in the afterburner to obtain the desired jet temperature. In the main burner, on the other hand, the amount of fuel supplied must be varied in dependence upon the temperature of the air entering the combustion chamber so as to maintain the desired turbine inlet temperature. Since the fuel flow to the main burners thus decreases with increase in compressor discharge temperature, this variation must be compensated for in the afterburner fuel control.

Figure 6:
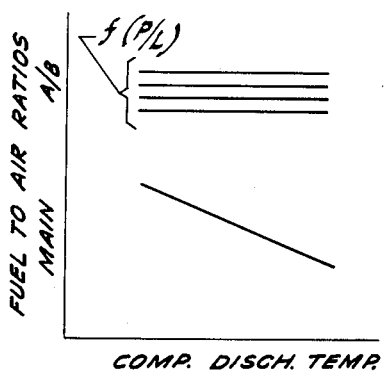
FIGURE 6 is a plot of fuel to air ratios in relation to compressor discharge temperature.
Figure 7:
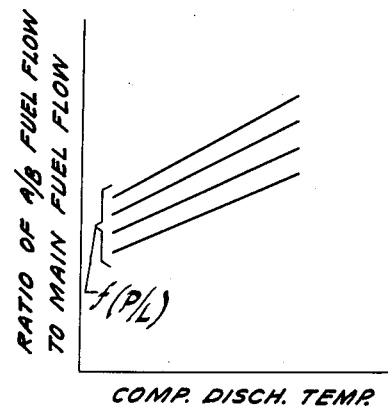
FIGURE 7 is a chart showing the ratio of afterburner fuel flow to main fuel flow as a function of compressor discharge pressure and power lever position.

These considerations are illustrated by the charts of FIGURES 6 and 7. The lower curve in FIGURE 6 indicates that the main fuel to air ratio decreases with increase in compressor discharge temperature. On the other hand, the upper parallel curves indicate that the ratio of afterburner fuel to air flow should remain constant notwithstanding changes in compressor discharge temperature. The ratio, as indicated by the family of parallel lines, is a function of power lever position, which determines the afterburner fuel ratio to provide the desired thrust augmentation.

FIGURE 7 shows the ratio of afterburner fuel flow to main fuel flow as a function of compressor discharge temperature and power lever position. Since afterburner fuel flow is to remain constant at any power lever position, the ratio of afterburner fuel to main fuel increases with compressor discharge temperature. The curves of FIGURES 6 and 7 are based on constant turbine temperature.

The mechanism by which the afterburner fuel is correlated with main fuel as a function of compressor discharge temperature and power lever position comprises the three-dimensional cam 61, previously referred to, which shifts the afterburner metering valve member 54 axially. Cam 61 is mounted on a shaft 90 which is slidably and rotatably mounted in fixed supports 91. An elongated pinion 92 fixed on shaft 90 is rotated by a rack 93 guided for reciprocation in a support 94. Rack 93 is mechanically or otherwise coupled to the power lever 43 by a suitable connection indicated by the broken line 96. Shaft 90 and, therefore, cam 61 are shifted axially in response to compressor discharge temperature which is sensed by a temperature bulb 97 mounted in the diffuser portion 12 of the engine and coupled by a pressure line 98 to an expansible bellows 99 mounted on a fixed support. Bellows 99 has a head 101 engaged in a groove 102 in the shaft 90 so that the shaft is shifted axially by expansion and contraction of the bellows, but is free to rotate relative to the bellows.

Figure 2:
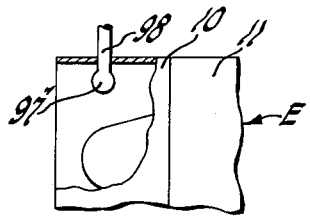
FIGURE 2 is a fragmentary view illustrating a modification of the system of FIGURE 1.

The contours of cam 61 are such that the ratio of afterburner to main fuel is adjusted in accordance with power lever position and compressor outlet temperature to suit the characteristics of the engine, in general as indicated in FIGURE 7. An increase in power lever position increases fuel and an increase in compressor discharge temperature increases the fuel in reciprocal relation to the effect of compressor outlet temperature on main fuel.

Where the engine operates at constant speed, there is a proportional relation between compressor inlet temperature and compressor outlet temperature. Thus, with afterburning at constant speed as indicated by line B in FIGURE 4, bellows 99 may respond to compressor inlet temperature rather than compressor outlet temperature, as indicated by the fragmentary view of FIGURE 2. FIGURE 2 shows a temperature bulb 97' mounted in the air inlet portion 10 of the engine and connected to the line 98 which leads to bellows 99. There are advantages to using compressor inlet temperature, particularly if this is a quantity sensed for fuel metering in the main fuel control, since a common temperature sensor may be connected to both controls. However, the inlet temperature sense gives inferior regulation characteristics if afterburning occurs at variable engine speed, since the ratio of compressor outlet temperature to compressor inlet temperature varies with engine speed.

The contour of the portions of cam 61 which are engaged by the valve stem 59 through the non-afterburning portion of the range of movement of control lever 43 is immaterial. This is true because, in order to obtain the abrupt change from non-afterburning to afterburning operation, afterburner fuel is shut off at valve 74 below the afterburning range of control.

The preceding discussion has assumed that the turbine operates at constant temperature when the afterburner is in operation. This is customary, and is desirable with our fuel control. Variations in turbine temperature will adversely affect the accuracy of our afterburner fuel control, unless additional compensating means are added to it. Such additional complication is undesirable.

However, it is common practice to maintain turbine temperature constant by varying the area of the exhaust nozzle 17. In short, turbine speed may be controlled by fuel regulation and turbine temperature by jet nozzle area regulation. It is also possible to invert this relation so that nozzle area is controlled in response to turbine speed and fuel is controlled in response to turbine temperature. In either case, both are controlled.

Turbine temperature usually is measured in terms of motive fluid temperature at the entrance to or exit from the turbine. A conventional nozzle area control responsive to turbine outlet temperature is illustrated schematically in FIG. 1. This temperature is measured by one or more thermocouples 106 in the turbine exhaust duct which operate through a suitable area control 107 including an amplifier and a servomechanism 108 connected to the variable nozzle 17 to vary nozzle area. The control opens the nozzle if turbine temperature is too high, and vice versa. The pilot's control may be connected to the amplifier, as indicated by the broken line 109, to supply a scheduled temperature input to the area control, which then responds to the difference between actual and scheduled temperatures. Ordinarily, the scheduled turbine temperature is constant through the afterburning range of movement of control lever 43, which is most suitable for our purposes.

It will be apparent from the foregoing that the control as illustrated provides a very simple and satisfactory means for metering afterburner fuel. Very little more structure is required to meter both main and afterburner fuel than would be required to meter main fuel alone. A very accurate control of the ratio between afterburner fuel and afterburner air available for combustion is readily maintained. Since the operation of the main control compensates for changes in density and heating value of the fuel, this compensation is carried into the afterburner control by the rotation of valve member 54 introducing the proportionality factor.

It should be understood that the particular instrumentalities illustrated are merely suitable ones chosen to illustrate the principles of the invention. Many forms of valves and controls therefor may be substituted for those shown to perform equivalent functions. In general, many modifications may be made by the exercise of skill in the art within the principles of the invention, which is not to be considered as limited or restricted by the description of structure illustrating the preferred embodiment thereof.

We claim:

1. A fuel supply and control system for a turbojet engine having a main burner and an afterburner and having means to maintain turbine temperature substantially constant during afterburning, the system comprising, in combination, a source of fuel under pressure, means including a main metering valve for connecting the source to the main burner, means including an afterburner metering valve for connecting the source to the afterburner, a manually settable control means, a main fuel control coupled to the said metering valves so as to operate both valves in the same sense with respect to increase or decrease of fuel flow, a control connection from the settable control means to the main fuel control, a control connection from the settable control means to the afterburner metering valve to operate the said valve in a second sense to increase or decrease afterburner fuel flow relative to main fuel flow, and means in the control connection responsive to temperature of air in the engine at a point ahead of the main burner operative to modulate afterburner fuel flow as a function of said temperature and increase the ratio of afterburner fuel to main fuel with increase in said air temperature.

2. A system as recited in claim 1 in which the air temperature responsive means responds to the temperature of compressor discharge air.

3. A system as recited in claim 1 in which the air temperature responsive means responds to the temperature of engine inlet air.

4. A fuel supply and control system for a turbojet engine having a main burner and an afterburner and having means to maintain turbine temperature substantially constant during afterburning, the system comprising, in combination, a source of fuel under pressure, means including a main metering valve for connecting the source to the main burner, means including an afterburner metering valve for connecting the source to the afterburner, a manually settable control means, a main fuel control coupled to the said metering valves so as to operate both valves in the same sense with respect to increase or decrease of fuel flow, a control connection from the settable control means to the main fuel control, a control connection from the settable control means to the afterburner metering valve to operate the said valve in a second sense to increase or decrease afterburner fuel flow relative to main fuel flow, means in the control connection responsive to temperature of air in the engine at a point ahead of the main burner operative to modulate afterburner fuel flow as a function of said temperature and increase the ratio of afterburner fuel to main fuel with increase in said air temperature, and means responsive to conditions indicative of the metering heads across the two metering valves operable to maintain proportional metering heads across the two metering valves.

5. A fuel supply and control system for a turbojet engine having a main burner and an afterburner and having means to maintain turbine temperature substantially constant during afterburning, the system comprising, in combination, a source of fuel under pressure, means including a main metering valve for connecting the source to the main burner, means including an afterburner metering valve for connecting the source to the afterburner, a manually settable control means, a main fuel control coupled to the said metering valves so as to operate both valves in the same sense with respect to increase or decrease of fuel flow, a control connection from the settable control means to the main fuel control, a control connection from the settable control means to the afterburner metering valve to operate the said valve in a second sense to increase or decrease afterburner fuel flow relative to main fuel flow, means in the control connection responsive to temperature of air in the engine at a point ahead of the main burner operative to modulate afterburner fuel flow as a function of said temperature and increase the ratio of afterburner fuel to main fuel with increase in said air temperature, and means responsive to fuel pressures downstream of the metering valves operable to maintain proportional metering heads across the two metering valves, the last-named means including a throttling valve downstream of the afterburner metering valve, means responsive to pressure downstream of the afterburner metering valve operative to open the throttling valve, and means responsive to pressure downstream of the main metering valve operative to close the throttling valve.

6. A fuel supply and control system for a turbojet engine having a main burner and an afterburner and having means to maintain turbine temperature substantially constant during afterburning, the system comprising, in combination, a source of fuel under pressure, means including a main metering valve for connecting the source to the main burner, means including an afterburner metering valve for connecting the source to the afterburner, a manually settable control means, a governor coupled to the said metering valves so as to operate both valves in the same sense with respect to increase or decrease of fuel flow, a control connection from the settable control means to the governor, a control connection from the settable control means to the afterburner metering valve to operate the said valve in a second sense to increase or decrease afterburner fuel flow relative to main fuel flow, means in the control connection responsive to temperature of compressor discharge air in the engine operative to modulate afterburner fuel flow as a function of said temperature and increase the ratio of afterburner fuel to main fuel with increase in said air temperature, and means responsive to fuel pressures downstream of the metering valves operable to miantain equal metering heads across the two metering valves, the last-named means including a throttling valve downstream of the afterburner metering valve, means responsive to pressure downstream of the afterburner metering valve operative to open the throttling valve, and responsive to pressure downstream of the main metering valve operative to close the throttling valve.

7. A fuel supply and control system for a turbojet engine having a main burner and an afterburner comprising, in combination, a source of fuel under pressure, means including a main metering valve for connecting the source to the main burner, means including an afterburner metering valve for connecting the source to the afterburner, a manually settable control means, a main fuel control coupled to the said metering valves so as to operate both valves in the same sense with respect to increase or decrease of fuel flow, a control connection from the settable control means to the main fuel control, a control connection from the settable control means to the afterburner metering valve to operate the said valve in a second sense to increase or decrease afterburner fuel flow relative to main fuel flow, and means responsive to fuel pressures downstream of the metering valves operable to maintain equal metering heads across the two metering valves, the last-named means including a throttling valve downstream of one metering valve, means responsive to pressure downstream of the said one metering valve operative to open the throttling valve, and means responsive to pressure downstream of the other valve operative to close the throttling valve.

References Cited in the file of this patent

UNITED STATES PATENTS

| | | |
|---|---|---|
| 2,520,967 | Schmitt | Sept. 5, 1950 |
| 2,566,373 | Redding | Sept. 4, 1951 |
| 2,953,899 | Sorensen | Sept. 27, 1960 |

FOREIGN PATENTS

| | | |
|---|---|---|
| 785,803 | Great Britain | Nov. 6, 1951 |